US012684160B2

(12) United States Patent　　　　　　(10) Patent No.:　US 12,684,160 B2
Mohan et al.　　　　　　　　　　　　　(45) Date of Patent:　　　Jul. 14, 2026

(54) TEMPORAL ATTENTION-BASED NEURAL NETWORKS FOR VIDEO COMPRESSION

(71) Applicant: InterDigital VC Holdings, Inc., Wilmington, DE (US)

(72) Inventors: Vineeth Rakesh Mohan, Sunnyvale, CA (US); Fabien Racape, San Francisco, CA (US); Ujwal Dinesha, College Station, TX (US); Hyomin Choi, Sunnyvale, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/721,964

(22) PCT Filed: Dec. 20, 2022

(86) PCT No.: PCT/US2022/053487
§ 371 (c)(1),
(2) Date: Jun. 20, 2024

(87) PCT Pub. No.: WO2023/122077
PCT Pub. Date: Jun. 29, 2023

(65) Prior Publication Data
US 2025/0056036 A1　　　Feb. 13, 2025

Related U.S. Application Data

(60) Provisional application No. 63/291,642, filed on Dec. 20, 2021.

(51) Int. Cl.
*H04N 19/513*　　　(2014.01)
*G06V 10/77*　　　(2022.01)
(Continued)

(52) U.S. Cl.
CPC ....... *H04N 19/521* (2014.11); *G06V 10/7715* (2022.01); *G06V 10/82* (2022.01);
(Continued)

(58) Field of Classification Search
CPC .. H04N 19/521; H04N 19/105; H04N 19/139; H04N 19/172; G06V 10/7715; G06V 10/82
(Continued)

(56) References Cited

U.S. PATENT DOCUMENTS

| | | | |
|---|---|---|---|
| 2021/0258510 A1* | 8/2021 | Woodall | H04N 23/6845 |
| 2022/0014708 A1* | 1/2022 | Bernasconi | G06T 3/4046 |
| 2022/0385907 A1* | 12/2022 | Zhang | H04N 19/172 |

OTHER PUBLICATIONS

Agustsson et al., "Scale-Space Flow for End-to-End Optimized Video Compression", CVPR, 2020, pp. 8503-8512.
(Continued)

*Primary Examiner* — Allen C Wong
(74) *Attorney, Agent, or Firm* — Condo Roccia Koptiw LLP

(57)　　　　　　ABSTRACT

Systems, methods, and instrumentalities are disclosed for video encoding and/or video decoding using artificial neural networks (e.g., convolutional neural networks or recurrent neural networks), attention, and/or attention with spatial attributes. For example, an apparatus may be configured to perform one or more of the following: obtaining a context block, a current block, and a latent vector associated with the context block; performing at least one convolution on the context block, the reference block, and the latent vector; generating motion flow data associated with the current block based on the at least one convolution; or generating a bitstream the comprises an indication of the motion flow data. The motion flow data may be quantized. The generated bitstream may comprise an indication of the quantized motion flow data.

17 Claims, 14 Drawing Sheets

(51) Int. Cl.
    *G06V 10/82*       (2022.01)
    *H04N 19/105*     (2014.01)
    *H04N 19/139*     (2014.01)
    *H04N 19/172*     (2014.01)

(52) U.S. Cl.
    CPC ......... *H04N 19/105* (2014.11); *H04N 19/139* (2014.11); *H04N 19/172* (2014.11)

(58) Field of Classification Search
    USPC .................................................... 375/240.16
    See application file for complete search history.

(56)                 References Cited

OTHER PUBLICATIONS

Bahdanau et al., "Neural Machine Translation by Jointly Learning to Align and Translate", arXiv:1409.0473, Sep. 1, 2014, pp. 1-15.

Ding et al., "Advances in Video Compression System Using Deep Neural Network: A Review and Case Studies", arvix.org; Cornell University Library, Jan. 16, 2021, 27 pages.

Liu et al., "A Unified End-to-End Framework for Efficient Deep Image Compression", arvix.org; Cornell University Library, Feb. 9, 2020, 12 pages.

Rippel et al., "ELF-VC: Efficient Learned Flexible-Rate Video Coding", arvix.org, Cornell University Library, Apr. 29, 2021, 14 pages.

Shi et al., "Convolutional LSTM Network: A Machine Learning Approach for Precipitation Nowcasting", Advances in Neural Information Processing Systems, 2015, pp. 1-9.

* cited by examiner

TEMPORAL ATTENTION-BASED NEURAL NETWORKS FOR VIDEO COMPRESSION

CROSS REFERENCE

The application is the National Stage Entry under 35 U.S.C. § 371 of Patent Cooperation Treaty Application No. PCT/US2022/053487, filed Dec. 20, 2022, which claims the benefit of U.S. Patent Application 63/291,642, filed Dec. 20, 2021, the contents of which are incorporated by reference in their entirety herein.

BACKGROUND

Video coding systems may be used to compress digital video signals, e.g., to reduce the storage and/or transmission bandwidth needed for such signals.

SUMMARY

Systems, methods, and instrumentalities are disclosed for video encoding and/or video decoding using artificial neural networks (e.g., convolutional neural networks or recurrent neural networks), attention, and/or attention with spatial attributes. For example, a video encoding device may be configured to perform one or more of the following: obtaining a context block, a current block, and a latent vector associated with the context block; performing at least one convolution on the context block, the reference block, and the latent vector; generating motion flow data associated with the current block based on the at least one convolution; or generating video data that includes an indication of the motion flow data. The motion flow data may be quantized. The generated video data may include an indication of the quantized motion flow data.

For example, the latent vector associated with the context block may indicate an attention for a context frame associated with the context block. The latent vector may be obtained using a context associated with the context block. The latent vector may be obtained using a weighted attention value associated with the context block. The weighted attention value associated with the context block may be obtained based on one or more attention values of respective blocks in previously reconstructed blocks. Spatial feature extraction may be performed. For example, spatial feature extraction may be performed using a Siamese network.

For example, a video decoding device may be configured to perform one or more of the following: obtaining encoded motion flow data (e.g., quantized motion flow data) associated with a current block; performing at least one deconvolution using a recurrent neural network on the encoded motion flow data; obtaining, based on the at least one deconvolution, a prediction block for the current block; or reconstructing the current block based on the prediction block and a residual. The deconvolution may be performed, for example, based on a latent vector associated with a context block. The latent vector may be obtained using a context associated with a context block. The latent vector may be obtained using a weighted attention value associated with a context block. The weighted attention value associated with the context block may be obtained based on attention values of respective blocks in previously reconstructed blocks.

Systems, methods, and instrumentalities may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

DETAILED DESCRIPTION

A more detailed understanding may be had from the following description, given by way of example in conjunction with the accompanying drawings.

Figure 1A:
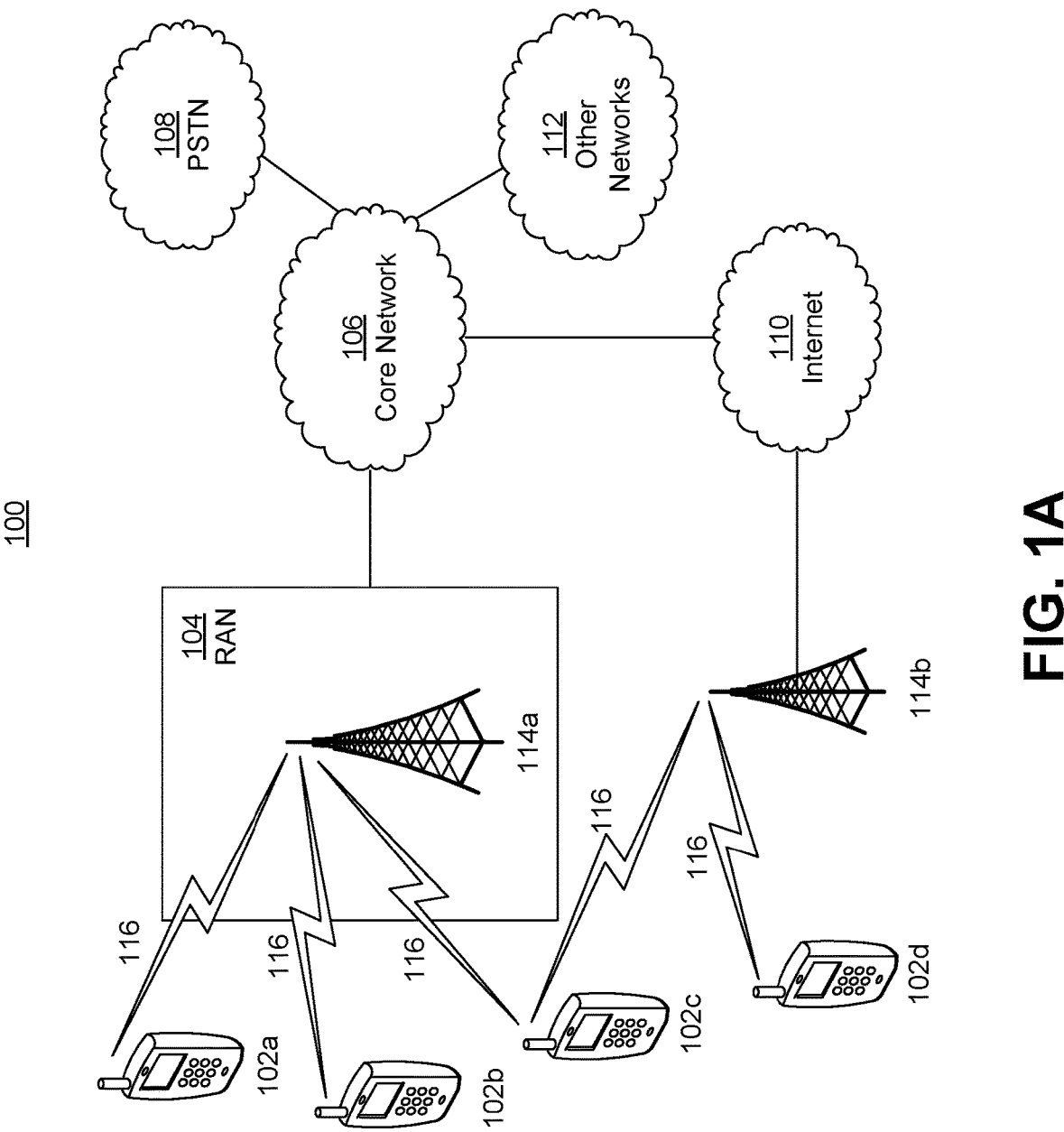
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
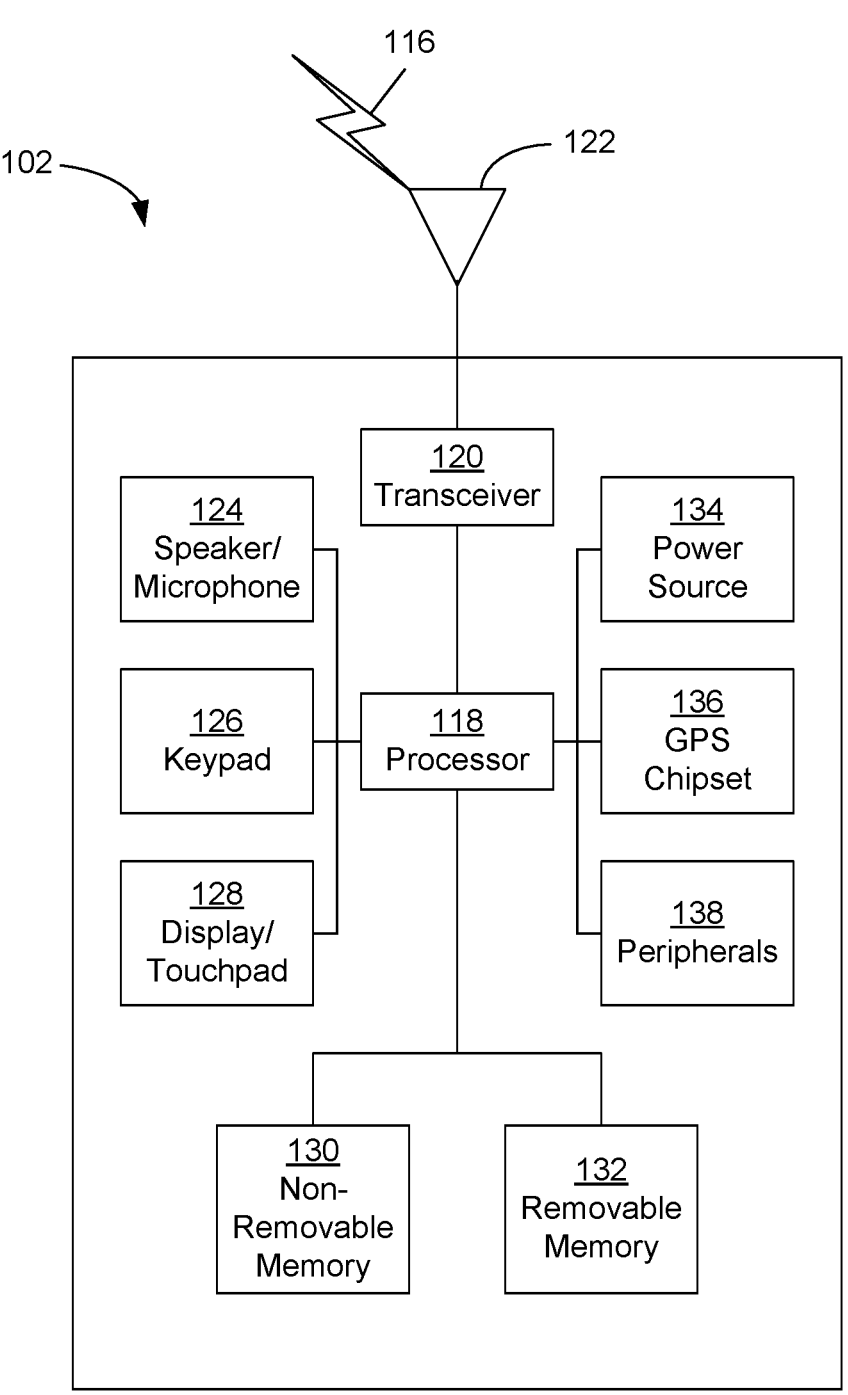
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
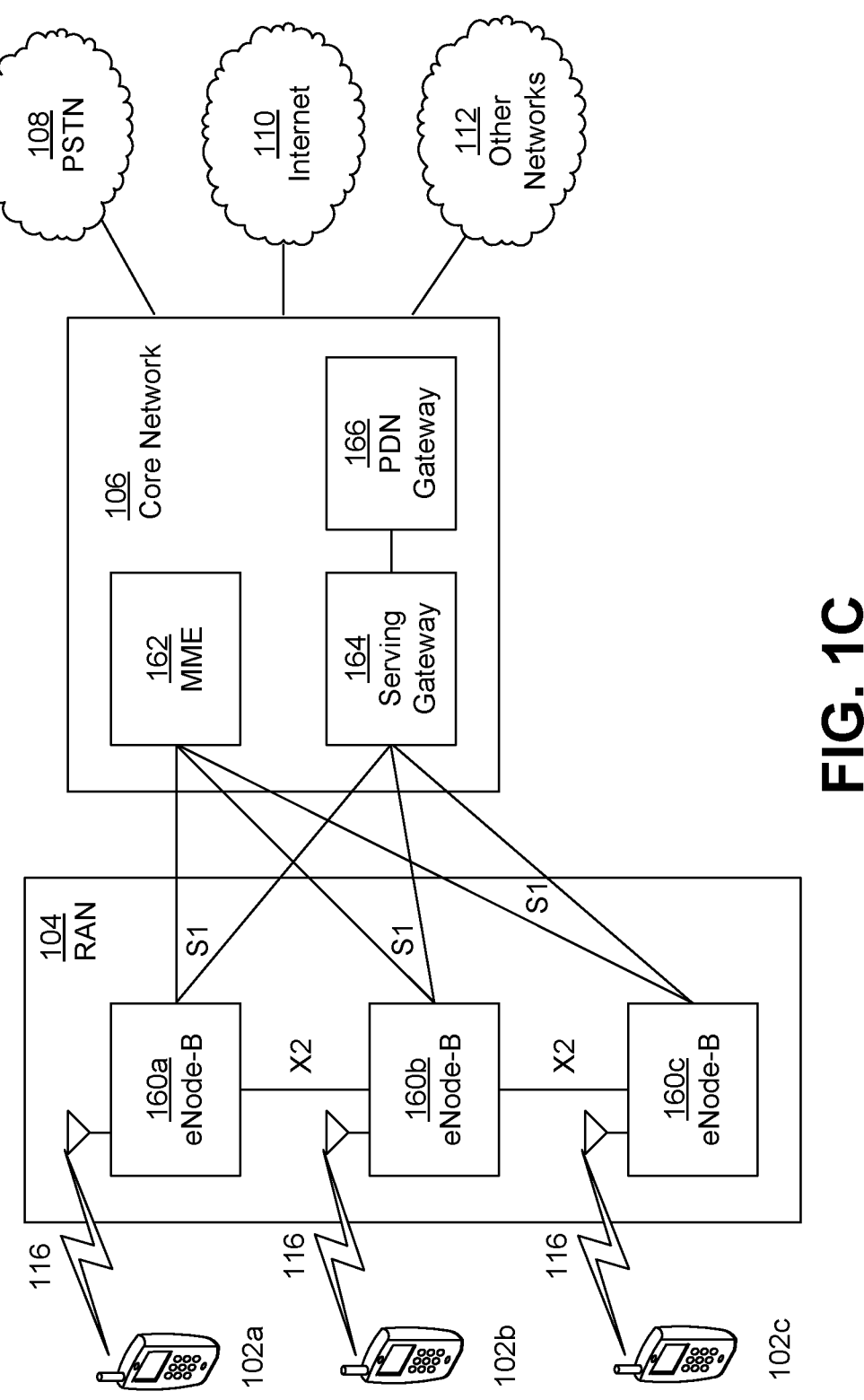
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
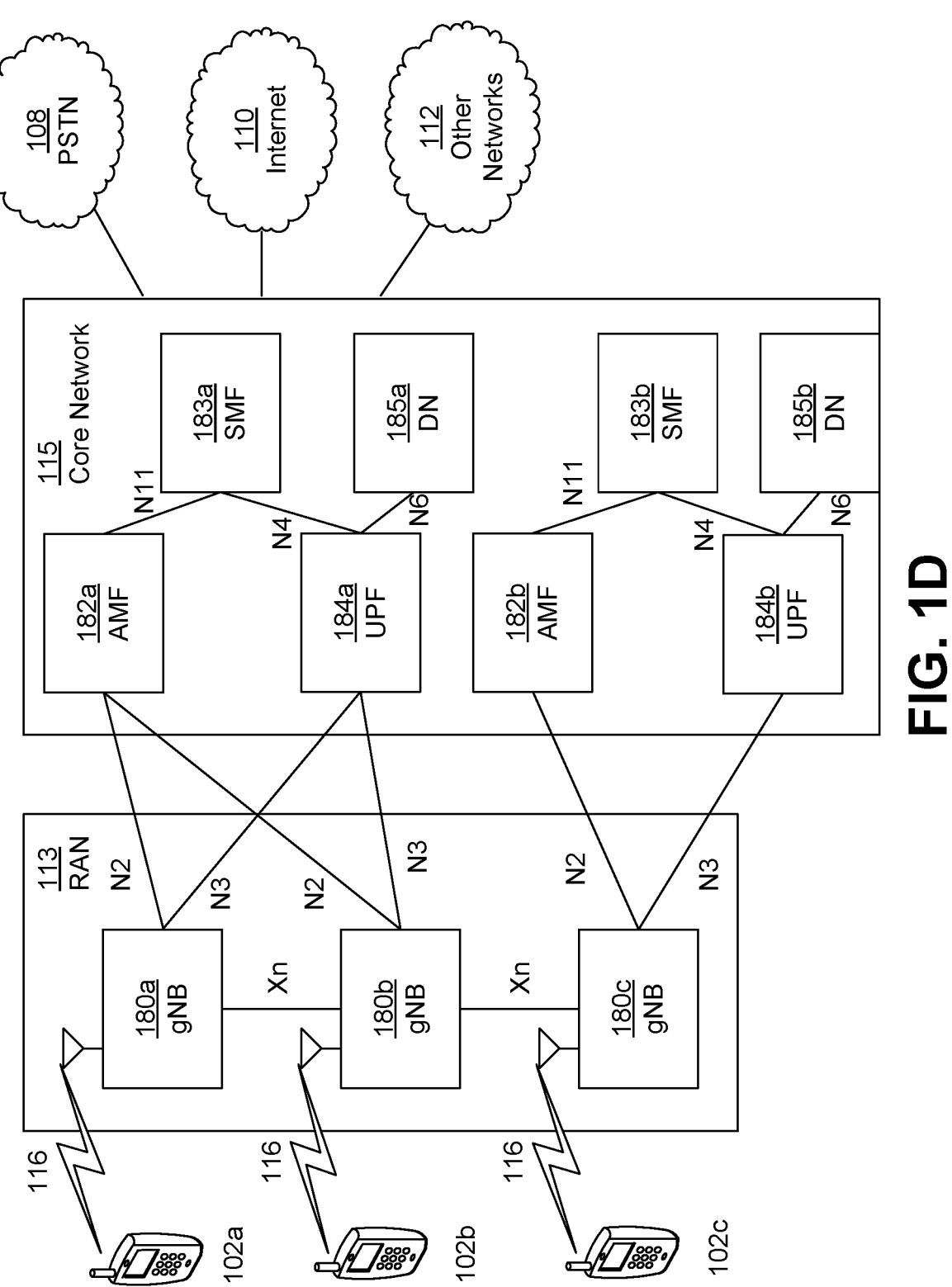
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-10 described herein may provide some examples, but other examples are contemplated. The discussion of FIGS. 5-10 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
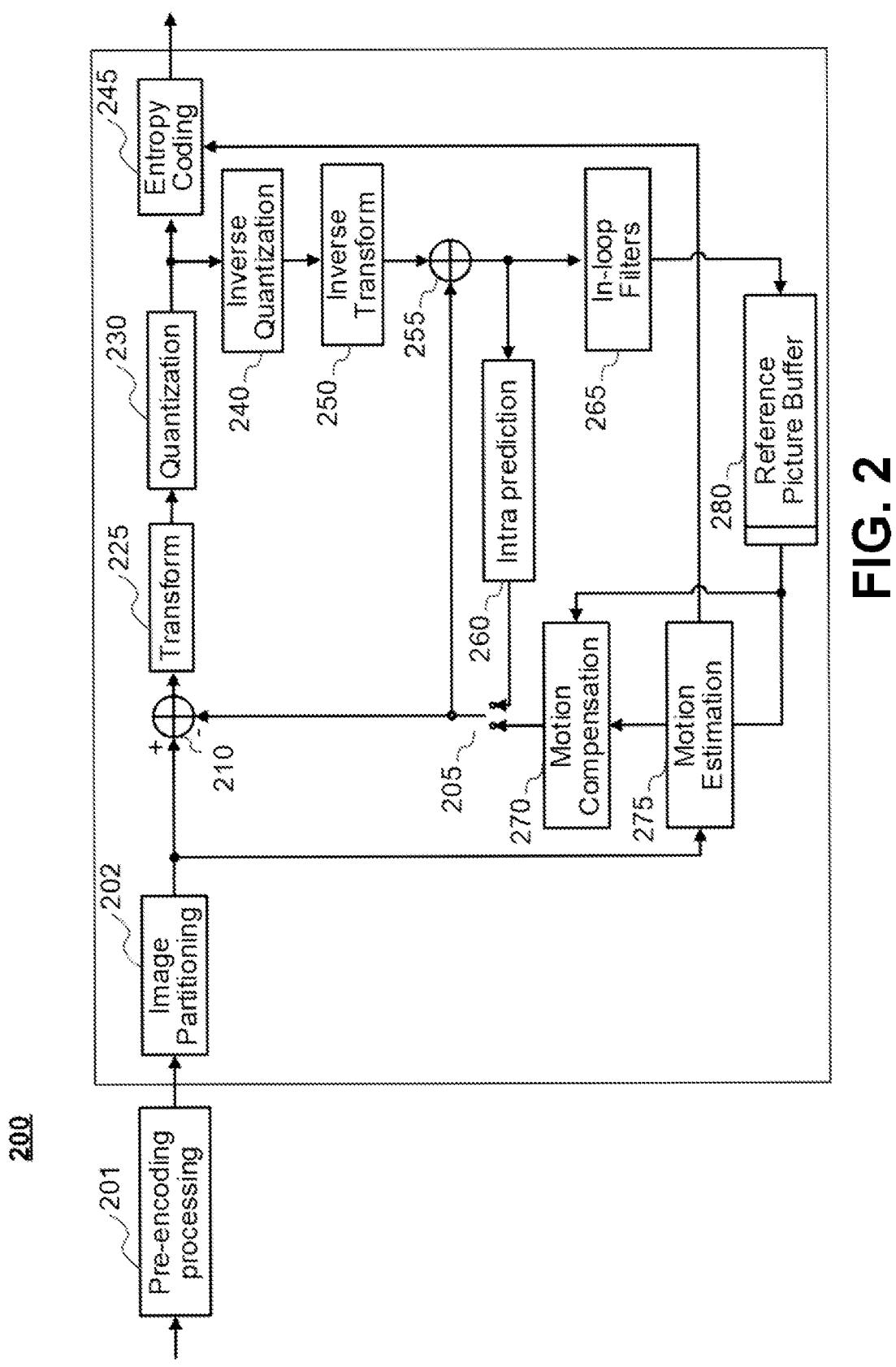
FIG. 2 illustrates an example block-based video encoder.
Figure 3:
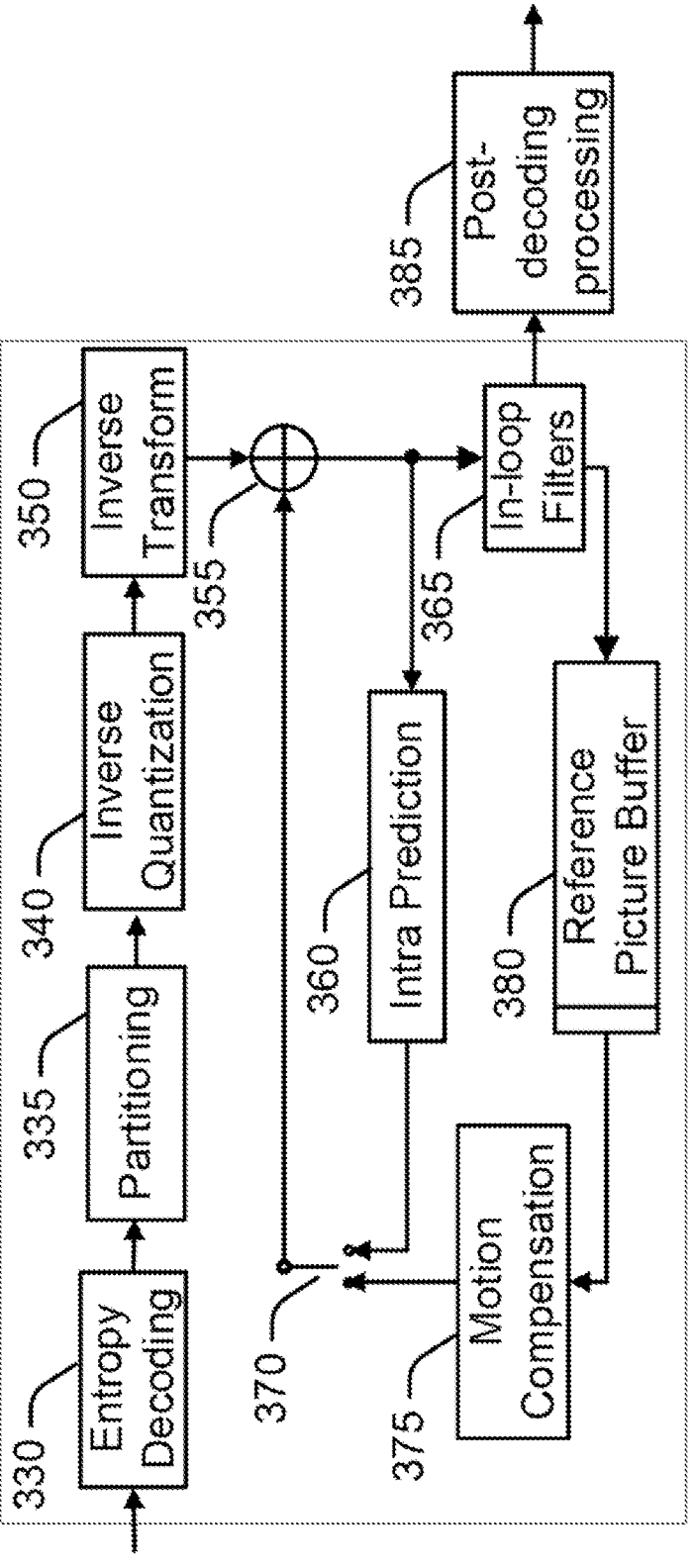
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
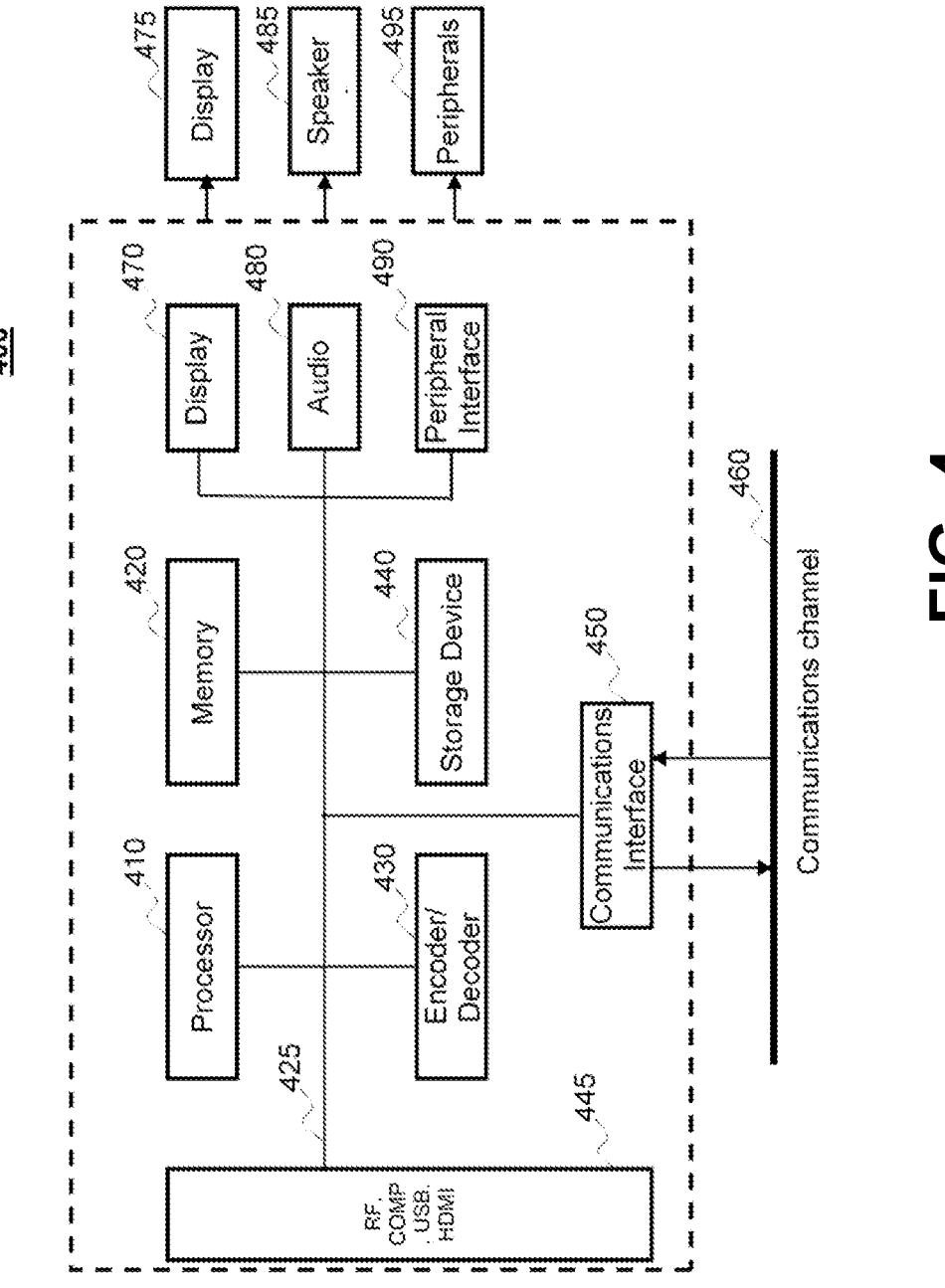
FIG. 4 illustrates an example of a system in which various aspects and examples may be implemented.

FIG. 4A is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4A, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, dequantization, performing deconvolution(s), obtaining a prediction block, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, performing convolution(s), obtaining a latent vector, generating motion flow data, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on latent vectors, attention values, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an indication of motion flow data, an indication of quantized motion flow data, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g. using a monitor, screen, or other type of display) a resulting image (e.g., an image from residual reconstruction of the video bitstream). The TV, set-top box, cell phone, tablet, or other electronic device may receive a signal including an encoded image and perform decoding.

Compression of video data may be performed, for example, using artificial neural network (ANN)-based tools. End-to-end deep video compression architecture (e.g., that specializes in estimating the motion flow, for example, depending on the temporal structure) may be used. Attention-based recurrent neural network architecture may be used. For example, the attention-based recurrent neural network architecture may enable capturing long-term and/or short-term dependencies between video frames. Capturing long-term and/or short-term dependencies between video frames may improve approximation of motion flow information (e.g., the motion vectors at each pixel location). Motion vectors may be estimated, for example, using one or more of the following: a recurrent neural network (e.g., that incorporates convolution and/or deconvolution operations); interframe attention blocks; or a feature extraction block (e.g., Siamese feature extraction block). A recurrent neural network (e.g., that incorporates convolution operations) may enable capturing long-term and/or short-term motion information. The recurrent neural network (RNN) that incorporates convolution operations may enable use of variable input image/frame sizes. Interframe attention blocks may enable prioritization of the estimation of motion vector, for example, on specific frame sequences. The feature extraction block (e.g., Siamese feature extraction block) may enable preservation of spatial features of the encoded video frames, for example, during the computation of attention.

ANN-based tools may be directly applied to end-to-end video compression models. ANN-based tools may reduce (e.g., aim at reducing) redundancies, for example, using handcrafted prediction, transforms, and entropy coding tools (e.g., at the block level). The attention mechanisms (e.g., as described herein) could replace or optimize motion estimation/compensation algorithms.

Image and video compression methods may use neural networks. ANN-based methods may use (e.g., rely on) parameters that are learned on a large dataset during training (e.g., contrary to traditional methods which may apply handcrafted prediction modes and transforms), for example, by iteratively minimizing a loss function. In compression examples, the loss function may describe the estimation of the bitrate of the encoded bitstream and/or an objective function of the decoded content. The quality of the reconstructed image may be optimized, for example, based on the measure of the signal distortion or an approximation of the visual quality (e.g., human-perceived visual quality).

Figure 5A:
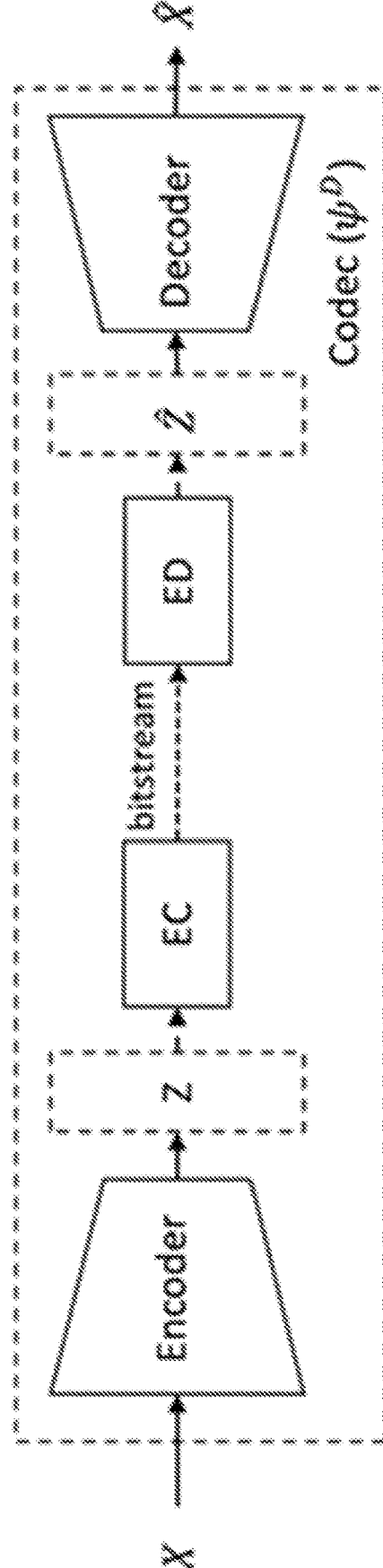
FIG. 5A illustrates an example of an end-to-end compression system.

FIG. 5A illustrates an example end-to-end compression system. The input X to the encoder part of the network may include one or more of the following: an image or frame of a video, a part of an image, a tensor representing a group of images/frames, or a tensor representing a part (e.g., crop) of a group of images/frames.

The input may have one or multiple color components, for example, such as monochrome, RGB, or YCbCr (YUV) components.

As shown in FIG. 5A, the input tensor X may be fed into the encoder network. The encoder network may include a sequence of convolutional layers (e.g., with non-linear activation functions). Convolutions and/or space-to-depth operations (e.g., large strides in the convolutions or space-to-depth operations) can be used to reduce the spatial resolution, for example, while increasing the number of channels. The encoder network can be (e.g., seen as) a learned analysis transform.

As shown in FIG. 5A, the output of the encoder network (e.g., the features map or latent Z) may be quantized and entropy coded (EC) as a binary stream (e.g., bitstream) for storage or transmission. The output of the encoder network may include video data and/or video information.

As shown in FIG. 5A, the bitstream may be entropy decoded (ED), for example, to obtain $\hat{Z}$ (e.g., the dequantized version of Z).

As shown in FIG. 5A, the decoder network may generate $\hat{X}$, for example, which may be an approximation of the (e.g., original) X tensor from the latent $\hat{Z}$. The decoder network may include a sequence of upsampling convolutions (e.g., deconvolutions or convolutions followed by upsampling filters) or depth-to-space operations. The decoder network can be (e.g., seen as) a learned inverse transform or a denoising and generative transform.

For example, a hyperautoencoder (e.g., hyper-prior) may be added to the network, for example, in order to learn (e.g., jointly learn) the parameters of the latent distribution for efficient compression. An end-to-end differentiable codec (e.g., any end-to-end differentiable codex) can be considered.

Figure 5B:
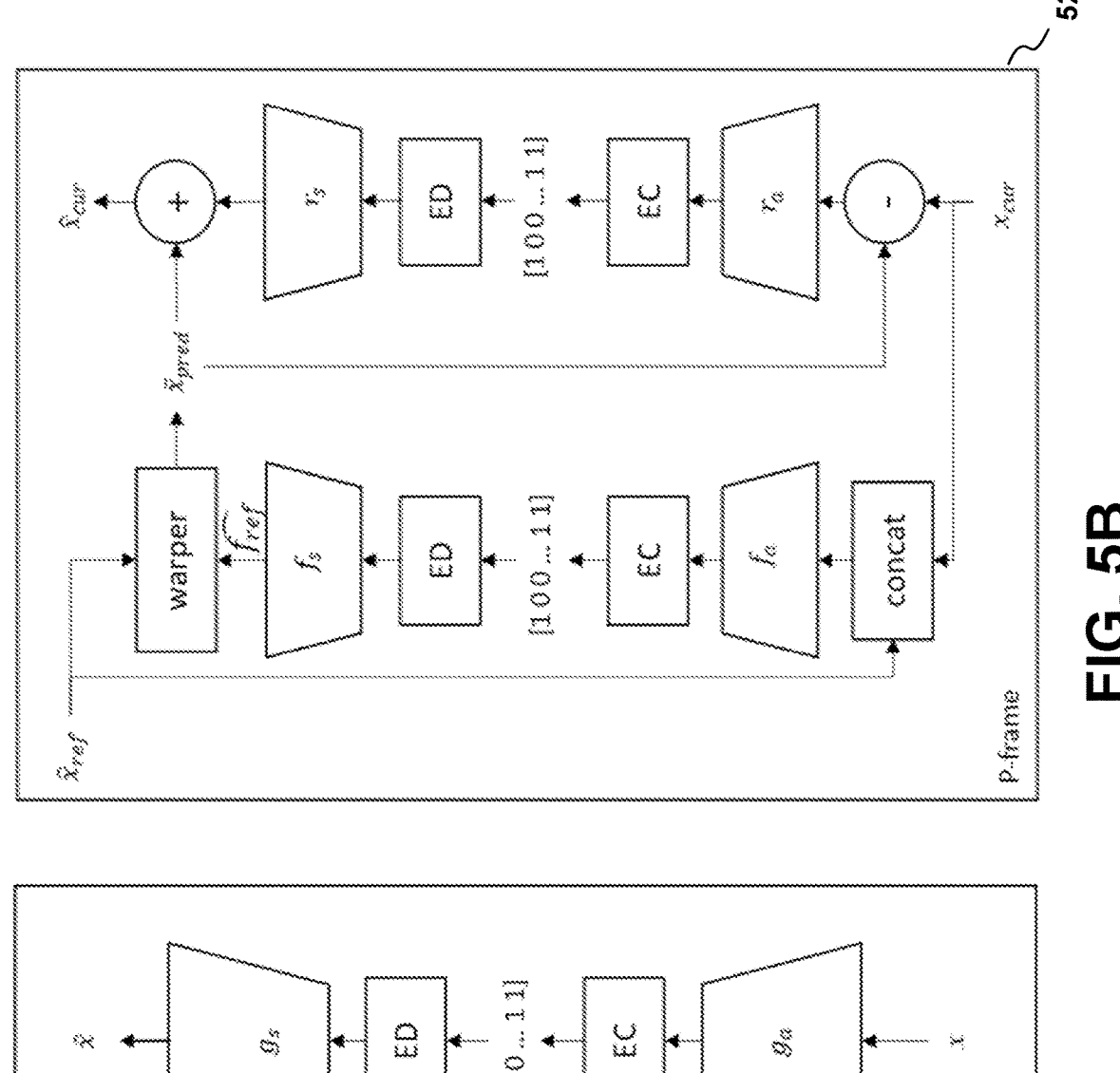
FIG. 5B illustrates an example neural network architecture for encoding and decoding video.

Video compression may be performed using artificial neural networks. FIG. 5B illustrates an example neural network architecture for encoding and decoding video. The architecture may include autoencoders that encode different elements for reconstructing (e.g., elements necessary to reconstruct) the decoded video frames, for example, while removing of inter-frame redundancies.

As shown in FIG. 5B, the I-frame block 510 may represent the encoding of key-frames, for example, which are independently encoded (e.g., intra). In examples, The processes relating to the I-frame block 510 and/or blocks as described herein may be (e.g., similarly) used at a picture level, a frame level, a block level, a slice level, a tile level, a subslice level, and/or the like. The I-frame block 510 may include a simple auto-encoder. The auto-encoder may perform convolutional analysis and synthesis. The auto-encoder may be developed for ANN-based image compression. An entropy coder (EC) and/or an entropy decoder (ED) may be used to remove redundancies (e.g., arithmetically remove redundancies), for example, at the inference.

The neural network architecture (e.g., as shown in FIG. 5B) may be used for compressing video frames. An optical flow may be computed (e.g., for predicted frames). An optical flow may estimate motion flow (e.g., a dense motion flow) between frames (e.g., each pixel location may be assigned a distinct 2d motion vector, such as horizontal or vertical).

For example, the procedures described herein for a block level may be used at a frame level. Predicted frames (e.g., P-frame 520 as shown in FIG. 5B) may be encoded (e.g., as shown in FIG. 5B), for example, if a (e.g., only one) reference frame is used. At the encoder, the inputs may be the current frame $x_{cur}$ and a previously reconstructed reference frame $\hat{x}_{ref}$. The image(s) (e.g., both images) may be used to derive and encode the motion information. The images may be concatenated as a tensor (e.g., unique tensor). The tensor may be the input of the motion flow autoencoder (e.g., $f_a$, $f_s$). The motion flow autoencoder may produce a reconstructed flow $\widehat{f_{ref}}$, for example. The reconstructed flow may be used, for example, to warp the reference frame $\hat{x}_{ref}$ onto the current frame, for example, because the decoder may have access to the reconstructed flow (e.g., the reconstructed flow only). This may produce a predictor for the current frame, $\overline{x}_{pred}$. The residual, corresponding to $x_{cur}-\overline{x}_{pred}$, may be encoded by ($r_a$, $r_s$). The reconstructed residual may be added to the reconstructed prediction, for example, to form the decoded image $\hat{x}_{cur}$. The decoded latent tensor representing motion information can be used (e.g., additionally and/or alternatively) as an input to the autoencoder processing the residual and can be concatenated with the decoded residual tensor (e.g., to reconstruct the residual in the image domain, as depicted in FIG. 6).

Figure 6:
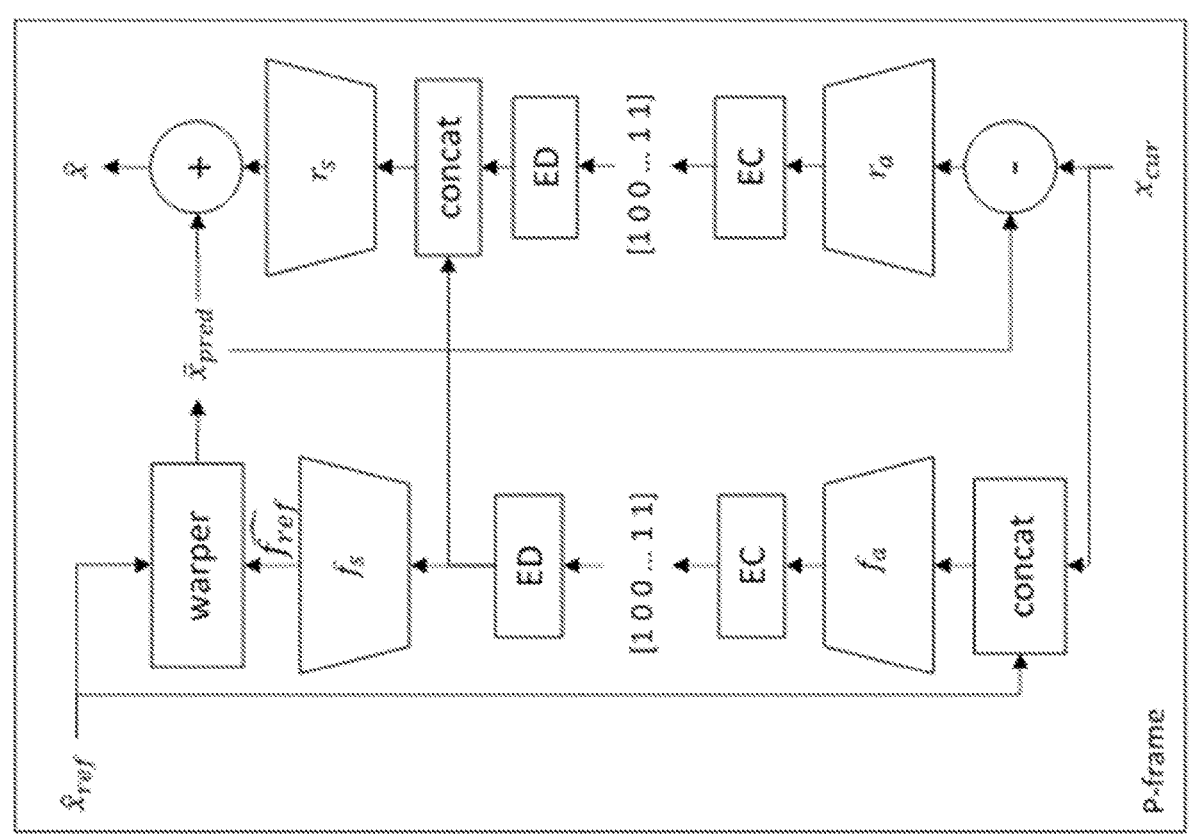
FIG. 6 illustrates an example of reconstructing the residuals using decoded motion information.
Figure 7:
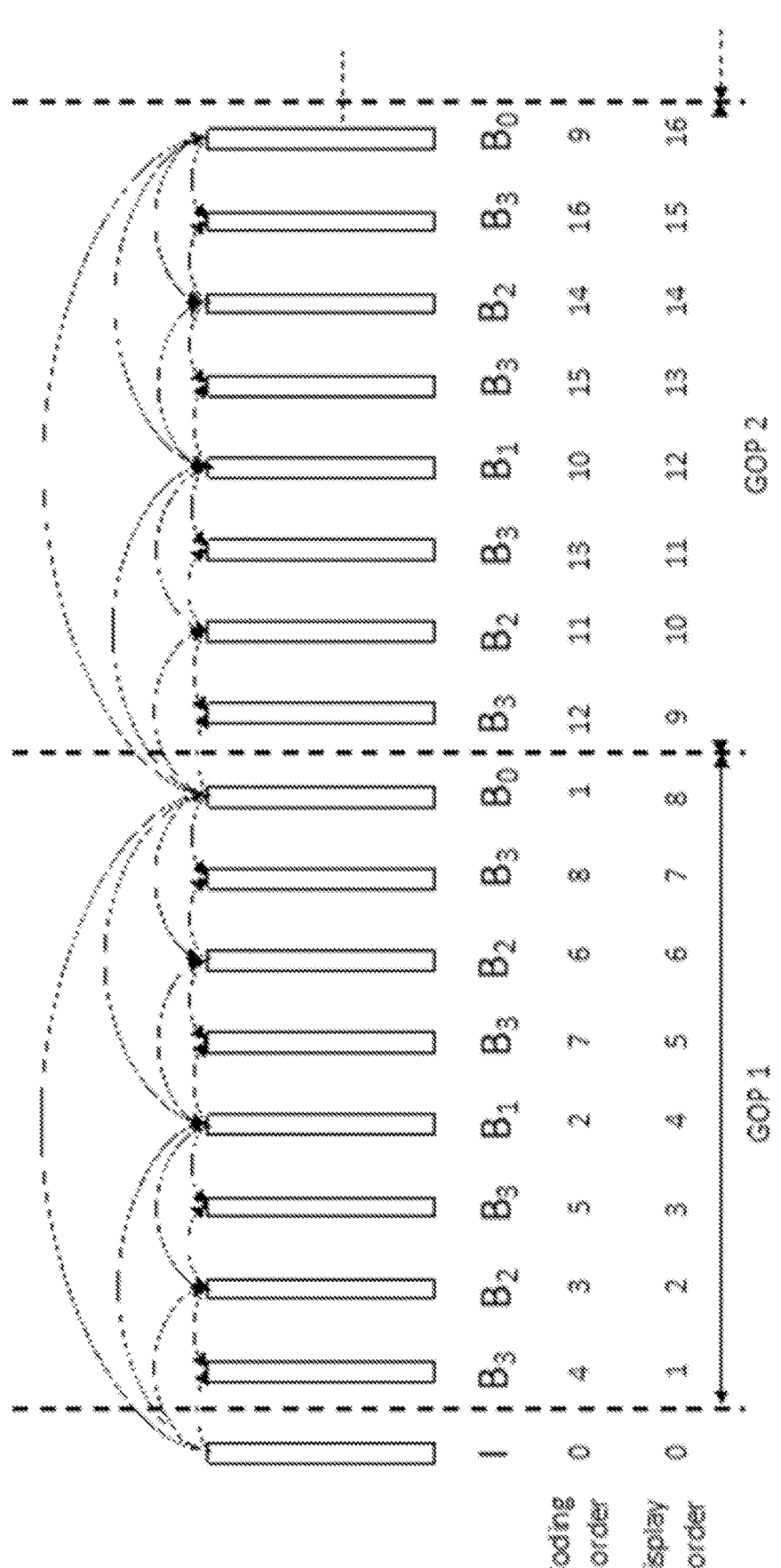
FIG. 7 illustrates an example random access type temporal structure for efficient video coding.

FIG. 6 illustrates an example of reconstructing the residuals using decoded motion information. Using ANN-based tools for video encoding and/or decoding may not be limited to the case of uni-directional predicted frames. FIG. 7 illustrates an example random access type temporal structure for efficient video coding. ANN-based tools can be adapted and used for different temporal structures (e.g., random access group of pictures (GOP) structures as depicted in FIG. 7, for example, where the order of coding may be modified such that most frames can be predicted using (e.g., multiple) already reconstructed past and/or future reference frames). As shown in FIG. 7, frames may be bi-predicted using past and future reference pictures (e.g., as shown by the B frames in FIG. 7).

For a current frame, $x_{cur}$, the reconstructed flow, $\widehat{f_{ref}}$, may depend on the previously reconstructed reference frame, $\hat{x}_{ref}$, for example, where the dependency may be captured (e.g., by learning the latent representation of the concatenated frames). Long-term dependencies between frames may be considered in video encoding and/or decoding. Learning the dependencies between frames at multiple temporal points may be helpful for encoding smooth and/or complex scene transitions. $\hat{x}_{ref}$ may include information (e.g., encoded information) of previous frame(s). RNNs (e.g., such as long short-term memory (LSTMs)) may help overcome the difficulty in encoding information of previous frames (e.g., using $\hat{x}_{ref}$).

End-to-end architecture of ANN may include by one or more of the following: (e.g., efficient) encoding of temporal dependencies between frames; incorporating attentions; or modeling attentions (e.g., with spatial attributes).

Figure 8:
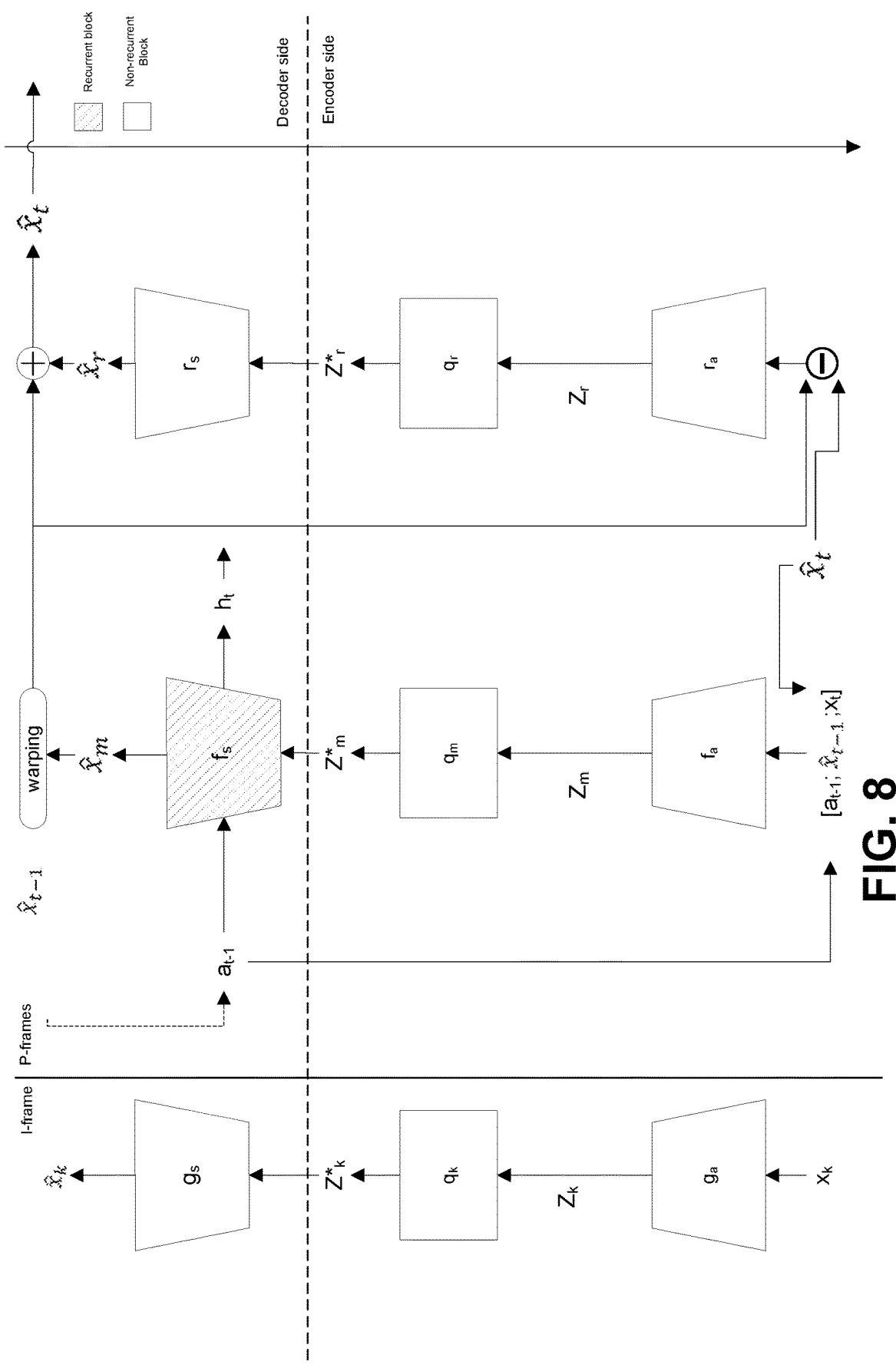
FIG. 8 illustrates an example architecture with a recurrent convolution (Conv-LSTM) block denoted by $f_s$.

For example, temporal dependencies between frames may be encoded. A recurrent neural network module (e.g., Conv-LSTM) may be used (e.g., on the decoder side of the architecture, as shown in FIG. 8), for example, to keep the state corresponding to the decoding of at least one previously decoded frame to account for the temporality and redundancies between the frames. Conv-LSTM may handle 2-dimensional inputs and can capture and process the 2d-spatial information. Conv-LSTM blocks may handle input images of varying sizes.

For example, attentions may be incorporated into the example end-to-end architecture of ANN. The Conv-LSTM and LSTM blocks may capture temporal dependencies. Attention mechanisms may capture complex short-term and/or long-term temporal dependencies, for example, in tasks such as language translation (e.g., natural language processing). Using an attention mechanism may enable encoding (e.g., a video compressor to encode) complicated scene transitions and motion information more accurately and using fewer bits (e.g., as compared to other approaches).

For example, modeling attentions with spatial attributes may be performed. Modeling attentions may be applied on text data. For example, the output of the LSTM cells may include a latent vector (e.g., latent tensor or latent representation) representing the context of a word. The output of an LSTM cell may be a matrix, which may be flattened to a 1-D vector.

Spatial context may be preserved. Preprocessing may be performed (e.g., prior to computing attention), for example, to preserve spatial attributes. Attention (e.g., in the context of natural language processing) may be used on word-embeddings (e.g., that did not necessarily have any strong spatial features) unlike in the case of images/video. Spatial feature extraction may be performed prior to computing attention. A Siamese architecture may be used to perform spatial feature extraction prior to computing attention.

Long-term dependency between frames may be captured and reconstruction may be improved, for example using one or more of the following: recurrent neural networks to capture long-term dependencies between frames and incorporate attentions to provide weighted importance to specifical intermediate frames.

RNN-based models (e.g., such as LSTMs and/or gated recurrent units (GRUs)) may be used, for example, in the context of natural language processing. RNN-based models may be used to capture dependencies between words and/or sentences, for example, that were seen in lines prior to a focal word (e.g., several lines prior to the focal word). RNNs may be integrated with an (e.g., existing) ANN-based compression system (e.g., as shown in FIG. 5B). Integrating RNNs with the ANN-based compression system may be difficult. The RNN model may be (e.g., designed used for natural language processing, for example, where spatial aspect of the data may be less important compared to the temporal aspect. Capturing the spatial features may be important for images. A (e.g., second) challenge in using RNNs (e.g., vanilla RNNs) may include that the RNNs may not be able to handle varying frame sizes. An example RNN (e.g., where dense vector operations in the LSTM cells are replaced with convolutions) may be used to overcome the issues of handling varying frame sizes. An attention mechanism may be added to the recurrent blocks with an (e.g., additional) Siamese sub neural architecture, for example, to better capture spatiotemporal structures in videos.

FIG. 8 illustrates an example architecture with a recurrent convolution (e.g., Conv-LSTM) block denoted by $f_s$. As shown in FIG. 8, the overall architecture of the model may include one or more of the following: an I-frame autoencoder, or a P-frame autoencoder.

The I-frame autoencoder may be a convolutional autoencoder (e.g., purely convolutional autoencoder), for example, which may be used to encode frames, (e.g., the first frame in a GoP). Encodings produced by the I-frame autoencoder may be large (e.g., in terms of bit size), for example, because the frame may be compressed standalone (e.g., with no existence of previous frame information to leverage). The I-frame autoencoder may include a (e.g., just one) branch, which may be a standard convolutional image compressor (e.g., as shown in FIG. 8).

The P-frame autoencoder (e.g., similar to FIG. 8) may include (e.g., two) separate branches. The P-frame autoencoder may include a branch to encode and/or decode the motion information (e.g., as shown by the middle branch in FIG. 8)) and a branch for the residual (e.g., as shown by the rightmost branch in FIG. 8).

Successive frames may be encoded in the GoP, for example, using the I-frame autoencoder and/or the P-frame autoencoder. Encodings produced here can be made small by using (e.g., taking advantage of) spatiotemporal patterns in the video and the pixel information from previously decoded frames. This may be done by transmitting (e.g., only transmitting) the quantized motion tensor ($z_m{}^*$) and the residual ($z_r{}^*$). The motion tensor may include information for warping (e.g., information needed to warp) the previously decoded frame into the (e.g., current) frame. The residual may include information (e.g., needed) for fine tuning and/or correcting errors and artifacts (e.g., errors and artifacts obtained after the warping operation). The RNN model may start at the input of the motion encoder $f_a$ (e.g., a convolution neural network). The latent vector (e.g., latent tensor, latent representation) of the previous frame may be $a_{t-1}$. The latent vector may be a vector associated with state information, for example, associated with previously reconstructed blocks. For example, the latent vector may represent information associated with the state of motions in previous frames. The latent vector may be used to predict current motion (e.g., motion information for a current frame). The latent vector may be used to predict current motion, for example, by considering context information (e.g., motion information associated with previously reconstructed frames). The latent vector may be obtained from the output of Conv-LSTM coupled with the attention block (e.g., as described herein, for example, with respect to FIG. 9). The latent vector may be concatenated, for example, along with the predicted previous frame $\hat{x}_{t-1}$ and the current frame $x_t$. The quantizer block $q_m$ may use hierarchical priors, for example, to quantize (e.g., efficiently quantize) the motion tensor.

For example, for the current block, a corresponding context block in the context frame (e.g., the previous frame $X_{t-1}$) may be obtained. A latent vector (e.g., latent tensor, latent representation) associated with the context block be obtained. A convolution (e.g., at least one convolution) may be performed on the context block, the reference block, and the latent vector, for example, to generate motion information (e.g., motion flow data) associated with the current block. The motion information (e.g., motion flow data) may be quantized and an indication of the motion information (e.g., motion flow data) may be included, for example, in generated video data (e.g., in the bitstream).

For example, for the current block, encoded motion information (e.g., quantized motion information), such as motion flow data (e.g., quantized motion flow data), may be obtained. A deconvolution (e.g., at least one deconvolution) may be performed on the encoded motion information (e.g., encoded motion flow data). The deconvolution may be performed using a recurrent neural network (e.g., as shown in FIG. 8 with respect to motion decoder $f_s$). A prediction block associated with the current block may be obtained, for example, based on the deconvolution. The current block may be reconstructed, for example, by combining the prediction block and a residual.

In examples, the convolution may be applied at different levels, such as at the picture, tile, slice, and/or coding block level. In examples, the latent vector may be applied at different levels, such as at the picture, tile, slice, and/or coding block level.

In the motion decoder $f_s$ block, the spatial and the temporal nature of frames may be leveraged, for example, using a convolution-based LSTM network (e.g., Conv-LSTM), which may avoid being restricted to the spatial aspects of the video frames. The convolution-based LSTM network (e.g., Conv-LSTM) may determine the future state of a certain cell in the grid, for example, by the inputs and past states of its local neighbors. The input gate, forget gate, cell state, output and the hidden states of the ConvLSTM at a (e.g., specific) time instance t may be computed using Eqs. 1-5, as described herein.

$$i_t = \sigma(W_{xi} * X_t + W_{hi} * H_{t-1} + W_{ci} \odot c_{t-1} + b_i) \qquad \text{Eq. 1}$$

$$f_t = \sigma(W_{xf} * X_t + W_{hf} * H_{t-1} + W_{cf} \odot c_{t-1} + b_f) \qquad \text{Eq. 2''}$$

$$c_t = f_t \odot c_{t-1} + i_t \odot \mathrm{Tlf} \mathrm{l}(W_{xc} * X_t + W_{hc} * H_{t-1} + b_c) \qquad \text{Eq. 3''}$$

$$o_t = \sigma(W_{xo} * X_t + W_{ho} * H_{t-1} + W_{co} \odot c_t + b_o) \qquad \text{Eq. 4''}$$

$$H_t = o_t \odot \mathrm{Tlf} \mathrm{l}(C_t) \qquad \text{Eq. 5''}$$

For example, * may denote the convolution operator. For example, $\odot$ may denote the Hadamard product. For example, W may be the weights of the network. For example, b may be the bias. For example, H may be the latent matrix. The ConvLSTM block may use (e.g., take) as its input the dequantized output of the motion encoder $z_m{}^*$ and/or the hidden state with attention from the previous timestep $a_{t-1}$. The ConvLSTM block (e.g., $f_s$) may produce the tensor $\hat{x}_m$ as its output, for example, which may include the motion information used (e.g., needed) to warp the previous frame $\hat{x}_{t-1}$ onto the current frame. The output may include a map of 2D motion vectors per pixel sample, as well as additional channels to store information such as a blur operator in the exemplary case of the space scale flow methods. A (e.g., each) pixel location can have multiple (e.g., 3) components (e.g., RGB, YUV, etc.). For example, the motion vector maps can have 6 channels (e.g., motion vectors for each color component), or 2 channels (e.g., if the motion information is considered the same for all color components). The ConvLSTM block (e.g., $f_s$) may output $h_t$. The output $h_t$ may include state information associated with the current frame. The output $h_t$ may be generated, for example, to update the context information to be used for subsequent frames. For example, the latent vector used for subsequent frames may be updated accordingly based on the output $h_t$.

The input to the residual branch may be $x_t$ and the warped $\hat{x}_m$ (e.g., which may be the error in prediction after warping). The input to the residual branch (e.g., $x_t$ and the warped $\hat{x}_m$) may be referred to as the residual. The residual may be encoded and included in the generated video data (e.g., video bitstream). The residual may be decoded and added to the warped motion $\hat{x}_m$ on the decoder side to produce the final reconstructed frame $\hat{x}_t$ for the time step (e.g., frame sequence index) t.

TABLE 1

| | Notations and Symbols |
| --- | --- |
| Symbol | Description |
| x | Video frame (input data) |
| $x_k$, $x_{cur}$ | Key frame and current frame respectively |
| $z^*$ | Quantized frame (denoted by * on the superfix) |
| $\hat{x}$ | Decoded frame |
| k, m, r | Indicates key, motion and reference objects |
| $x_m$, $x_r$ | Encoded motion and residual frames respectively |

TABLE 1-continued

| Symbol | Description |
|---|---|
| | Notations and Symbols |
| h | Latent representation of the frames |
| t | Index of the frame sequence, t = {1, . . . , n} |
| $g_a$, $g_s$ | I-frame encoder and decoder blocks respectively |
| $f_a$, $f_s$ | Motion encoder and decoder blocks respectively |
| $r_a$, $r_s$ | Residual encoder and decoder block respectively |
| q | Quantization block |
| + | Tensor Addition |
| − | Tensor Subtraction |
| x | Scalar multiplication with tensor |

Modeling attentions may be performed. LSTMs may capture both long-term and short-term information across time. Attentions may be used to improve LSTM performance for large temporal sequences. Attentions may be applied in a variety of scenarios, for example, such as in neural machine translation (NMT). These attentions may be applied over individual frame sequences across time.

Attention may create shortcuts between the context vector and the entire source input. The weights of these shortcut connections may be customizable for an (e.g., each) output element. Customizing the weights of the shortcut connections for an (e.g., each) output element may enable prioritization of the reconstruction of a frame at time t (e.g., the context) using different weights on the hidden states of the past video frames. Emphasis may be placed on the frames that can best predict the current frame (e.g., for random and complex motions such as scene cuts), for example.

Figure 9:
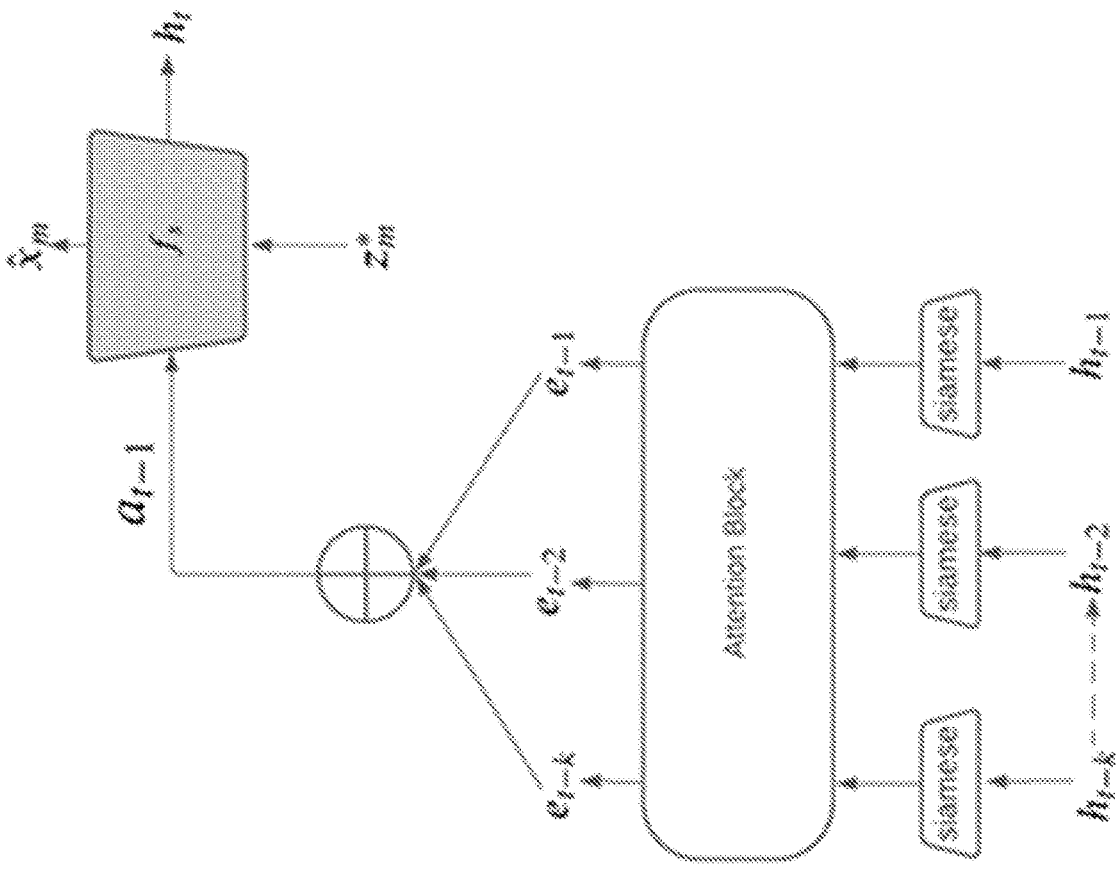
FIG. 9 illustrates an example attention architecture for the frame $x_{t-1}$.

FIG. 9 illustrates an example attention architecture for the frame $x_{t-1}$. As shown in FIG. 9, $h_{t-1}$ may represent the latent representation of $x_{t-1}$ from the LSTM (e.g., at time step t−1). The calculating of attention for the context frame $x_{t-1}$ may be calculated using Eqs. 6 and 7 as follows:

$$e_{t-i} = \frac{\exp(h_{t-i}h_{t-1})}{\sum_{i=1}^{k}\exp(h_{t-i}h_{t-1})} \qquad \text{Eq. 6}$$

$$a_{t-1} = \sum_{i=1}^{k}e_{t-i}h_{t-1} \qquad \text{Eq. 7}$$

For example, $h_{t-1}$ may be the hidden states (e.g., latent representations) of frames i={1, . . . , k} with context windows of size k. These may be provided by the outputs of ConvLSTM. Pairwise dot product may be performed between $h_{t-1}$ and (e.g., all) the hidden states of these past frames (e.g., $h_{t-2}$, $h_{t-k}$, etc.) followed by a Softmax operation, for example, to get weights and/or attentions of individual past frames to the current frame to be decoded (e.g., as shown by Eq. 6). The hidden states may be an input to an attention block (e.g., trained attention block, for example, based on trained parameters). The attention block may be used to perform convolutions on the input. The output of the attention block may include vectors and/or tensors. The output vectors and/or tensors may be weighted. The final weighted attention over the context frame may be obtained by summing across the entire latent sequences weighted by their corresponding attention factors with respect to $h_{t-1}$ (e.g., as shown by Eq. 7). In examples, $a_{t-1}$, may be a weighted state associated with the $x_{t-1}$ frame (e.g., best weighted state for the $x_{t-1}$ frame). $a_{t-1}$ may represent context information up to the $x_{t-1}$ frame. The final weighted attention over the context frame may be input to the $f_s$ block (e.g., as described herein with respect to FIG. 8).

Figure 10:
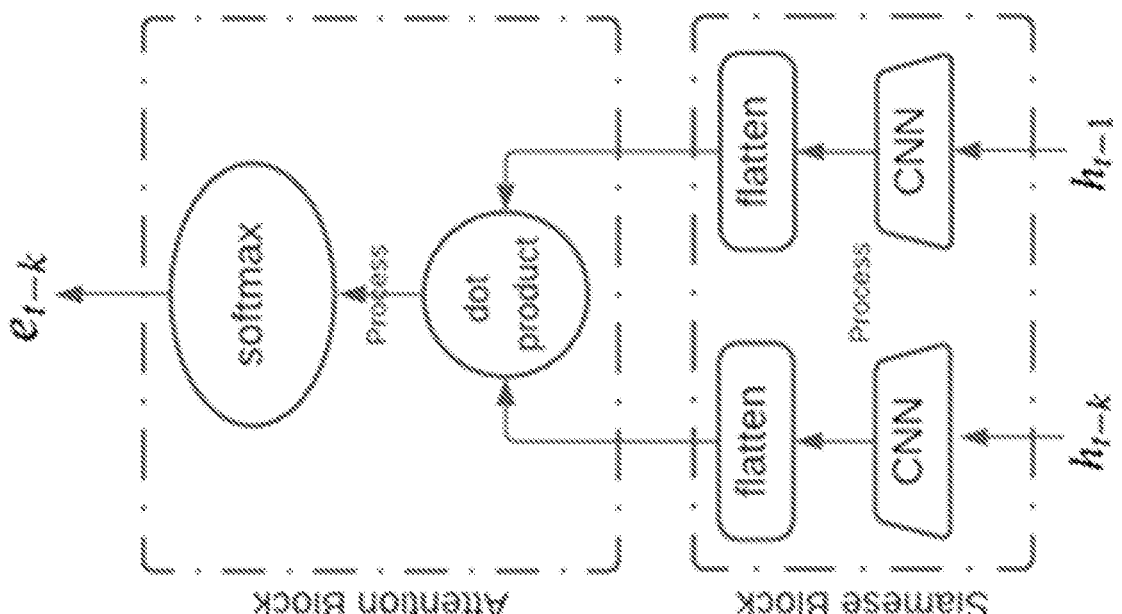
FIG. 10 illustrates an example computation of attention $h_{t-k}$ with respect to $h_{t-1}$.

Spatial attributes may be preserved, for example, using Siamese Network. FIG. 10 illustrates an example computation of attention $h_{t-k}$ with respect to $h_{t-1}$. As shown in FIG. 10, the Siamese part of the example architecture may be expanded. A Siamese network may be a type of neural network where parameters are shared. For example, both $h_{t-k}$ and $h_{t-1}$ may be fed through the same neural network which shares same convolution kernels, which may be followed by flattening of the resulting feature representations. The hidden states may be passed through a Siamese sub neural network, for example, to perform spatial feature extraction (e.g., because any spatial feature may be lost during the flattening and the dot product operations used (e.g., needed) to compute similarity). The Siamese network may be a convolutional encoder within the main architecture.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video decoding device, comprising:
   a processor configured to:
      obtain encoded motion flow data associated with a current block;
      obtain a motion latent vector based on an attention associated with motion information from at least one past block and based on state information associated with the at least one past block, wherein the at least one past block is a previously reconstructed block;
      obtain decoded motion flow data based on the encoded motion flow data and the motion latent vector;
      generate a prediction block for the current block based on the decoded motion flow data; and
      reconstruct the current block based on the prediction block.

2. The video decoding device of claim 1, wherein the decoded motion data is obtained using a deconvolution on the encoded motion flow data and the motion latent vector.

3. The video decoding device of claim 2, wherein the deconvolution is performed using a recurrent neural network.

4. The video decoding device of claim 1, wherein the processor is further configured to:
   concatenate the encoded motion flow data and the motion latent vector, wherein the decoded motion flow data is obtained based on the concatenation.

5. The video decoding device of claim 1, wherein the state information indicates a latent representation.

6. The video decoding device of claim 1, wherein the at least one past block is a first past block, and wherein the attention associated with motion information from the at least one past block is obtained further based on respective state information from the first past block and a second past block, wherein the each of the state information is associated with a respective latent representation.

7. The video decoding device of claim 1, wherein the processor is further configured to:

obtain a weighted attention value, wherein the motion latent vector is obtained further based on the weighted attention value.

8. A video encoding device, comprising:

a processor configured to:

obtain a motion latent vector based on an attention associated with motion information from at least one past block, and based on state information associated with at least one previously encoded block;

obtain a reference block and a current block;

generate motion flow data associated with the current block based on the current block, the reference block, and the motion latent vector; and generate video data that comprises an indication of the motion flow data.

9. The video encoding device of claim 8, wherein the motion flow data associated with the current block is generated further based on performing a convolution on the current block, the reference block, and the motion latent vector.

10. The video encoding device of claim 9, wherein the processor is further configured to:

generate, based on the convolution performed on the current block, a latent representation for the current block for generating motion flow data associated with a second block.

11. The video encoding device of claim 8, wherein the motion latent vector is configured to indicate an attention associated with the current block.

12. The video encoding device of claim 8, wherein the processor is further configured to:

perform spatial feature extraction, wherein the motion latent vector is obtained further based on the performed spatial feature extraction.

13. A video decoding method, comprising:

obtaining encoded motion flow data associated with a current block;

obtaining a motion latent vector based on an attention associated with motion information from at least one past block and based on state information associated with the at least one past block, wherein the at least one past block is a previously reconstructed block;

obtaining decoded motion flow data based on the encoded motion flow data and the motion latent vector;

generating a prediction block for the current block based on the decoded motion flow data; and reconstructing the current block based on the prediction block.

14. The video decoding method of claim 13, wherein the decoded motion data is obtained using a deconvolution on the encoded motion flow data and the motion latent vector, wherein the deconvolution is performed using a recurrent neural network.

15. The video decoding method of claim 13, wherein the method further comprises:

concatenating the encoded motion flow data and the motion latent vector, wherein the decoded motion flow data is obtained based on the concatenated encoded motion flow data and the motion latent vector.

16. The video decoding method of claim 13, wherein the at least one past block is a first past block, and wherein the attention associated with motion information from the at least one past block is obtained further based on respective state information from the first past block and a second past block, wherein each of the state information is associated with a respective latent representation.

17. The video decoding method of claim 13, wherein the method further comprises:

obtaining a weighted attention value, wherein the motion latent vector is obtained further based on the weighted attention value.

* * * * *